United States Patent [19]
Klaus et al.
[11] 3,843,221
[45] Oct. 22, 1974

[54] CENTRAL STORE FOR RECORD SUPPORTS

[75] Inventors: Zahnert Klaus; Jürgen Hauptvogel, both of Dresden, Germany

[73] Assignee: VEB PENTACON DRESDEN Kamera-und Kinowerke, Dresden, Germany

[22] Filed: Dec. 19, 1972

[21] Appl. No.: 316,469

(30) Foreign Application Priority Data
June 27, 1972 Germany .......................... 164104

[52] U.S. Cl. ............ 312/223, 214/DIG. 2, 312/97.1
[51] Int. Cl. .......................... A47f 1/00, A47b 53/00
[58] Field of Search .............. 312/59, 50, 97.1, 202, 312/186, 197, 223, 268, 234; 214/16.1–16.4, DIG. 2; 221/82, 83, 86

[56] References Cited
UNITED STATES PATENTS

| | | | |
|---|---|---|---|
| 2,889,187 | 6/1959 | Caruso | 312/97.1 |
| 3,127,055 | 3/1964 | Dew et al. | 221/82 |
| 3,339,993 | 9/1967 | Stoddard | 312/234.1 |
| 3,463,566 | 8/1969 | Powers | 312/223 |
| 3,603,478 | 9/1971 | Connan | 221/87 |

*Primary Examiner*—Casmir A. Nunberg
*Attorney, Agent, or Firm*—William A. Drucker

[57] ABSTRACT

The storage apparatus comprises a drum mounted in a shaft for continuous rotation, said drum being formed with a number of radially disposed open ended storage compartments in which are stored cassettes containing record supports. Each compartment has releasable means for securing the cassettes in position within the compartment Mounted on a fixed position on the apparatus in close proximity to the drum is a feed station capable of receiving the returning storage unit. A drag arm, rotatable on said shaft but at a faster speed than the rotating drum serves to receive the storage from the feed station and convey it around the rotating drum to the appropriate storage compartment.

11 Claims, 6 Drawing Figures

CENTRAL STORE FOR RECORD SUPPORTS

BACKGROUND TO THE INVENTION

The invention relates to a central store for record supports, particularly microfilm sheets, a number of record supports being situated in independent storage units, preferably cassettes.

A known storage device comprises record supports in cassettes accommodated in drums, the desired record support being drawn out of the front of the drum by means of access mechanisms and conveyed to the point for further processing. The cassette is locked in position during this access operation.

This apparatus not only necessitates the means for tracing the required record support or cassette, together with the coding thereby required, but also involves considerable expense in connection with the positioning of the access mechanisms. Furthermore, it does not ensure permanent access to all cassettes, since during the selection of the desired record support of one cassette the others in the drum cannot undergo the search process.

The object of the invention is to avoid the aforementioned drawbacks and to provide a central store for record supports, ensuring permanent access to all these latter, without being more complicated in construction.

SUMMARY OF THE INVENTION

According to the invention we provide a record storage apparatus in which a number of record supports are situated in independent storage units, which in their turn are accommodated in open ended storage compartments arranged radially in at least one axially mounted drum further comprising a driving shaft carrying said drum, means for effecting continuous drive of said drums through said shaft, means in each compartment for detachably mounting said storage units within said compartments, a feed station for receiving extracted storage units mounted in a fixed position in the apparatus and a drag arm mounted to rotate about said shaft and serving for the reception of a storage unit from the feed station and capable of rotation about said shaft asynchronously with respect to the rotational speed of the drum to enable the storage unit to be introduced into its appropriate compartment.

According to further characteristics of the invention, the compartments are open on the periphery of the drum, the cassettes being detachably connected with the compartments via release mechanism. The latter consist of plate springs, each having a lug and being capable of engaging recesses on the cassettes via perforations in the walls of the drum. The plate springs are connected with actuating elements, preferably electromagnets. In addition, each compartment is provided with spring elements on the side opposite to its opening.

In a further advantageous development of the invention each drum is provided with a feed station serving to accommodate processed cassettes and having bent holding bars. For this purpose, each drum is equipped with a drag arm which is movable about its shaft asynchronously with the rotation of the drum and which has entrainment rods which can engage between the bent holding bars of the feed station in question. The drag arms also have catches which can engage receiving elements provided on the walls of the drum.

The drag arms according to the invention are detachably connected with locking devices integral with the housing. Each drum is also provided with an insertion cam.

In a first variant of the insertion devices the drag arms are equipped with bent levers fitted with weights. Restoring springs integral with the housing are also provided for the drag arms.

In a second variant, each drag arm is equipped with a helical spring, connected with the shaft, the drag arm being provided with a winding spring which belongs to a tilting lever and which is integral with the shaft.

The advantages offered by the invention reside in the fact that it thus provides a central store for a record support ensuring automatic access to large numbers of record supports, at the same time only occupying moderate space. This store also guarantees constant access to all the cassettes stored. Important conditions for the connection of this central store to a data processing plant are thus fulfilled. In addition, the cost of this apparatus remains within acceptable limits.

BRIEF DESCRIPTION OF DRAWINGS

The invention will be described below in detail, in conjunction with an example. The diagrams are as follows.

Figure 1:
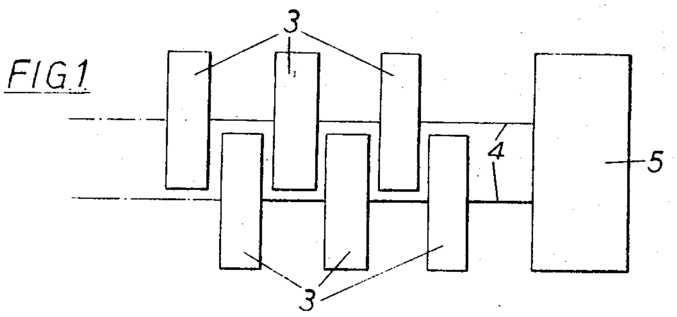
FIG. 1: a schematic illustration of the arrangement of the drums.

As may be seen from FIG. 1, drums 3 are offset in relation to one another, on two parallel shafts 4, in such a way that the said drums 3 extend into the gaps of the respective adjacent drums 3 mounted on the opposite shaft 4, the said shafts 4 being connected with a driving mechanism 5 which is in permanent operation.

Figure 2:
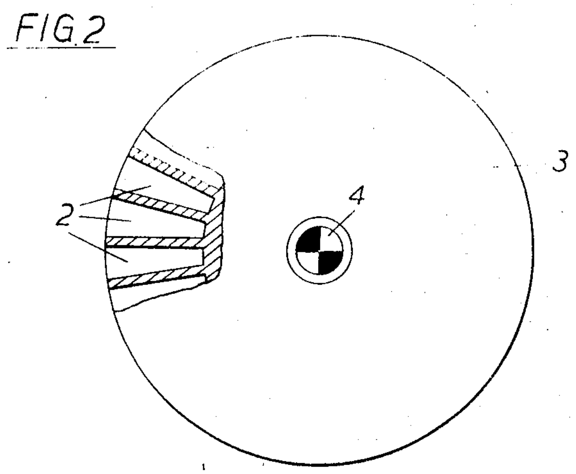
FIG. 2: a view of the drum with the system of compartments.

FIG. 2 shows that the drums 3 are provided radially with compartments 2 which are open on the periphery of the said drums 3.

Figure 3:
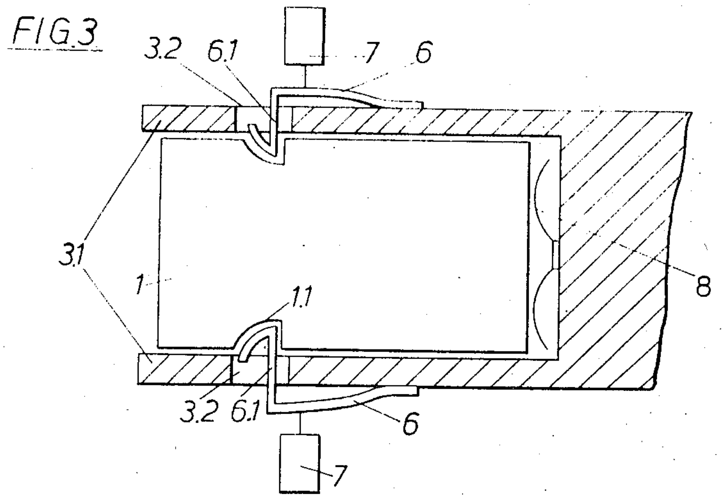
FIG. 3: a sectional diagram of a compartment.

FIG. 3 shows that the compartments 2 contain cassettes 1 which are held by lugs 6.1 of plate springs 6 in their recesses 1.1, in opposition to the action of spring elements 8, the plate springs 6 affixed to the outside of the walls 3.1 of the drums extending by their lugs 6.1 through perforations 3.2 of the drum walls 3.1 into the recesses 1.1 of the cassettes 1. In addition, the plate springs 6 are provided with actuating elements 7 to release the cassette mounting.

Figure 4:
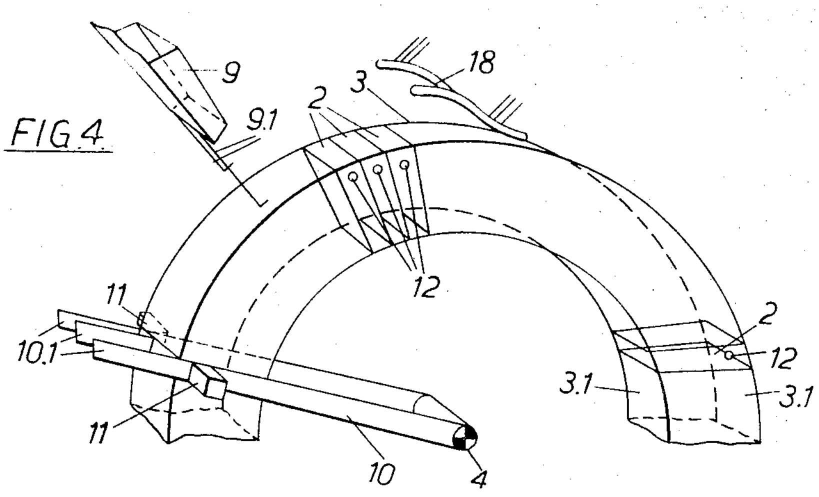
FIG. 4: a diagram of the cassette insertion mechanism, in perspective.

FIG. 4 shows how a drag arm 10 is movably mounted around the shaft 4 of the drum 3 and is provided with entrainment rods 10.1, as well as with catches 11. The drum walls 3.1 are provided with receiving elements 12, which correspond to the compartments 2 and which serve for the catches 11. A feed station 9, integral with the housing, is provided outside the periphery of the drum 3 and fitted with bent holding bars 9.1. An insertion cam 18 integral with the housing is likewise provided.

Figure 5:
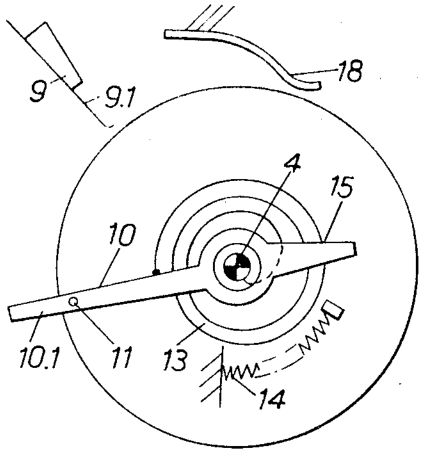
FIG. 5: a variant of the construction of the drag arm guide element.

As may be seen from FIG. 5, the drag arm 10, in this variant of the construction of the drag arm guide elements, is provided with a helical spring 13 connected to the said arm and to the shaft 4. Its prolongation has a tilting lever 15, integral with the housing and serving as an actuating element for a winding spring 14.

Figure 6:
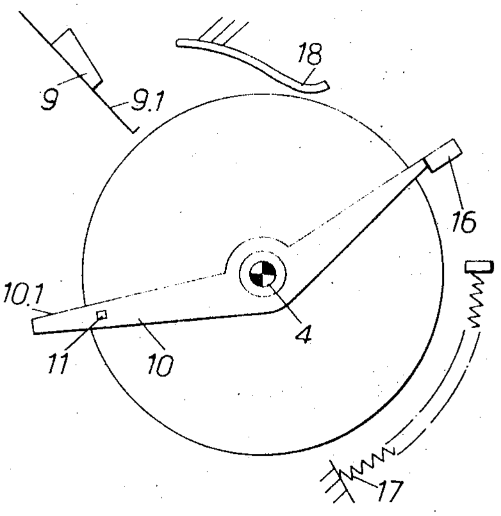
FIG. 6: another variant of this construction for the drag arm guide elements.

In another variant, as shown in FIG. 6, a bent lever on the drag arm 10 is fitted with a weight 16. A restoring spring 17, integral with the housing, is provided for the purpose of returning the drag arm 10 to the initial position.

The central store functions as follows:

Record supports, which consist, for example of microfilm sheets, are accommodated in cassettes 1 which are secured, by means of lugs 6.1 of the plate springs 6, engaging their recesses 1.1., in compartments 2 of constantly rotating drums 3. On the drum walls 3.1 all of the compartments are coded, in a manner already known, by means of strips of different brightness, for which purpose code reading devices on a photoelectric basis, likewise not shown in detail, are also provided.

If access is required to a certain microfilm sheet in a cassette 1, the code reading devices ascertain the relevant compartment 2 in the drum 3 concerned and operate in such a way that at a certain moment, when the said compartment 2, in the rotation of the drum 3, approaches the lowest point of the projection of the rotary movement, the actuating element 7 attracts the plate springs 6 for the desired compartment 2 for a short time, in such a way that the lugs 6.1 release the recesses 1.1, so that the cassette 1, by the action of the spring element, is pushed out of the compartment 1, supported by gravity, in which process it drops onto a conveyor belt, not shown in the drawing, and is conveyed from that position to the point for further processing.

After the processing, conveyor belts, which are likewise not shown in the drawing, convey the cassette 2 to the feed station 9 on the corresponding drum 3. In the said station it is taken up by the bent holding bars 9.1. After the code reading devices have determined the particular compartment 2 concerned, which takes place at the moment when the said compartment 2, in the rotation of the drum 3, passes the code reading devices integral with the housing, the said devices release a locking device which is not shown in detail and which serves for the drag arm 10.

Two variants of this cycle of operations are possible.

In the first variant, owing to the effect of the helical springs 15, the drag arm 10, after the release, is moved in the direction in which the drum rotates, thus at a higher speed. When the drag arm 10 with the cassette 1 has reached the relevant compartment 2, a code scanning device, not shown in detail, actuates the catch 11 on the drag arm, the said catch then engaging the receiving element 12. The entrainment rods 10.1, via the gaps of the holding bars 9.1, then engage the cassette 1 on the feed station 9 and cause it to accompany their movement. By this process the cassette 1 is held in the position corresponding to its empty compartment. Owing to gravity, and by the aid of the insertion cam 18, the cassette 1 is moved in its compartment 2, so that the lugs 6.1 of the plate springs 6 once again take up the cassettes 1 in their recesses 1.1. When this compartment 2 has left the zone of the insertion cam 18, the catch 11 is once again released from the receiving element 12. Since in the meantime the tilting lever 15 has placed the winding spring 14 under tension, the latter returns the drag arm 10 to its initial position, where it is also once again locked. The helical spring 13 is thus likewise placed under tension.

The second variant only differs from the first in that the helical spring 13 is replaced by a weight 16, which is mounted on a bent lever of the drag arm 10 in such a way that on releasing the said drag arm 10 it guides the latter, as a result of the gravity, for the reception of the cassette 1 and the insertion of the free compartment 2. After the insertion process has been completed the restoring spring 17, which has thus been placed under tension, catapults the drag arm 10 back into its initial position for the locking action.

In another possible construction, not explained here in detail, the cassettes can also be inserted into the compartments by pneumatic devices.

It is also possible for the drums to be mounted side by side on one shaft only.

We claim:

1. In a storage apparatus for record supports in which a number of record supports are situated in independent storage units, which in their turn are accommodated in open ended storage compartments arranged radially in at least one axially mounted drum, the provision of:

a. a driving shaft carrying said drum,
b. means for effecting continuous drive of said drum through said shaft to allow continuous scanning and access to said storage units,
c. means in each compartment for detachably securing said storage units within said compartments,
d. means within each compartment to effect release of said storage units from said compartments,
e. a feed station mounted in a fixed position in the apparatus for receiving storage units, and
f. a drag arm mounted to rotate about said shaft and serving for the receiption of a storage unit from the feed station and capable of rotation about said shaft asynchronously with respect to the rotational speed of the drum to enable the storage unit to be introduced into its appropriate compartment.

2. A storage apparatus according to claim 1, wherein the means for detachably securing said record supports with each compartment comprises leaf-type springs which each have a lug and can penetrate recesses of the storage unit via perforations in the walls of the drum, and wherein the means for releasing the storage units comprise electromagnetic actuating elements connected with the leaf-type springs.

3. A storage apparatus according to claim 2, wherein each compartment of the drum is provided, on the side opposite to its aperture, with spring elements for urging the storage unit radially outwards of the compartment.

4. A storage apparatus according to claim 1, wherein the feed station has holding bars bent at an angle and serving to accommodate processed storage units.

5. A storage apparatus according to claim 4, wherein the drag arm has entrainment rods which can engage the space between the bent holding bars of the feed station in order to entrain the storage unit accommodated therein.

6. A storage apparatus according to claim 5, wherein the drag arm has catch devices in the form of spring-mounted pins, which can engage receiving elements, preferably apertures, on the walls of the drum.

7. A storage apparatus according to claim 6, wherein the drag arm is detachably connected with locking devices mounted on a fixed position on the apparatus.

8. A storage apparatus according to claim 7, wherein a curved slide-in device is provided for the drum.

9. A storage apparatus according to claim 8, wherein the drag arms have levers bent at an angle and provided with weights, while restoring springs are provided for arresting the drag arms.

10. A storage apparatus according to claim 8, wherein a sprral spring is affixed to the drag arm and is connected with the shaft, while the drag arm bears a winding spring, which is arranged between an extension of the drag arm and a fixed point on the apparatus.

11. A storage apparatus according to claim 1, wherein a plurality of said drums are mounted on a plurality of shafts parallel to one another, said driving shafts being so spaced apart and said drums on each shaft being so axially spaced apart that the drums of one shaft extend into the spaces between the drums of the other shaft.

* * * * *